United States Patent
Watanabe et al.

(10) Patent No.: US 11,064,128 B2
(45) Date of Patent: Jul. 13, 2021

(54) EXPOSURE SETTING APPARATUS, CONTROL METHOD THEREOF, AND STORAGE MEDIUM

(71) Applicant: CANON KABUSHIKI KAISHA, Tokyo (JP)

(72) Inventors: Kazuhiro Watanabe, Tokyo (JP); Mayu Asano, Tokyo (JP); Takeshi Kikkawa, Yokohama (JP); Shingo Yamazaki, Fuchu (JP); Takeshi Nakata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/988,159

(22) Filed: Aug. 7, 2020

(65) Prior Publication Data
US 2021/0044735 A1  Feb. 11, 2021

(30) Foreign Application Priority Data

Aug. 9, 2019 (JP) .............................. JP2019-147957

(51) Int. Cl.
*H04N 5/235* (2006.01)

(52) U.S. Cl.
CPC ......... *H04N 5/2352* (2013.01); *H04N 5/2351* (2013.01)

(58) Field of Classification Search
CPC .. H04N 5/2352; H04N 5/2351; H04N 5/2353; H04N 5/232933; H04N 5/232935; H04N 5/232939; H04N 5/232941; H04N 5/232945
See application file for complete search history.

(56) References Cited

U.S. PATENT DOCUMENTS

| 8,665,355 | B2 * | 3/2014 | Imai | H04N 5/23293 348/333.02 |
| 8,947,574 | B2 * | 2/2015 | Takano | H04N 1/6027 348/333.01 |
| 10,048,850 | B2 * | 8/2018 | Takahashi | G06F 3/04847 |
| 2015/0350533 | A1 * | 12/2015 | Harris | H04N 5/23216 348/362 |
| 2017/0332008 | A1 * | 11/2017 | Tsuchiya | H04N 5/23216 |

FOREIGN PATENT DOCUMENTS

JP  2007-096682 A  4/2007

* cited by examiner

*Primary Examiner* — Luong T Nguyen
(74) *Attorney, Agent, or Firm* — Cowan, Liebowitz & Latman, P.C.

(57) ABSTRACT

There is provided an exposure setting apparatus. A display control unit performs control to display a coordinate system region, a first indicator, and a second indicator on a display unit. The coordinate system region represents a coordinate system that includes a first axis corresponding to a first exposure control parameter and a second axis corresponding to a second exposure control parameter. The first indicator indicates positions, in the coordinate system region, of a plurality of combinations of a value of the first exposure control parameter and a value of the second exposure control parameter that correspond to a predetermined exposure. The second indicator indicates a position, in the coordinate system region, of a combination of the setting value of the first exposure control parameter and the setting value of the second exposure control parameter.

12 Claims, 13 Drawing Sheets

F I G. 1
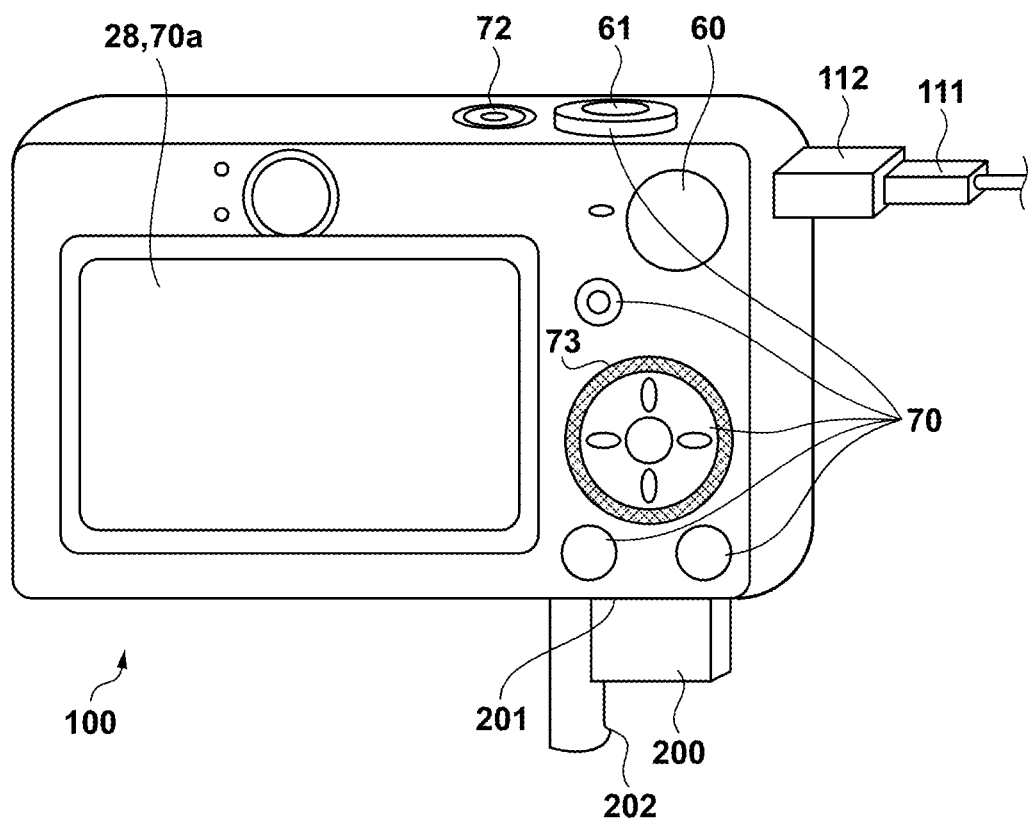

EXPOSURE SETTING APPARATUS, CONTROL METHOD THEREOF, AND STORAGE MEDIUM

BACKGROUND OF THE INVENTION

Field of the Invention

The present invention relates to an exposure setting apparatus, a control method thereof, and a storage medium.

Description of the Related Art

In a digital camera, control for appropriately setting the exposure at the time of capturing an image of a subject is performed in line with a so-called image capturing intent, that is to say, what kind of image a user wishes to capture. For example, the user selects a mode, such as an aperture priority mode and a shutter speed priority mode, and sets the aperture amount or the shutter speed in accordance with the selected mode. In a digital camera, along with the setting of the aperture amount or the shutter speed by the user, other setting values are decided on automatically, and the exposure is decided on based on these setting values.

However, there has been a problem that a user who is not familiar with image capturing cannot intuitively understand how other setting values change and the exposure is decided on as a result of changing a certain setting value in these modes, and the user has a hard time mastering the use. For example, in the shutter speed priority mode, if the shutter speed is reduced in line with an image capturing intent of producing a photograph showing the flowing water of a river, the aperture value is reduced (the aperture closes) and the depth of field increases in consequence; as a result, background blurring is difficult to achieve. There has been a problem that a user who is not familiar with image capturing cannot understand this relationship, and has a hard time setting a combination of the shutter speed, the aperture value, and the like (exposure conditions) that is just right for an image capturing intent.

Japanese Patent Laid-Open No. 2007-96682 discloses display of a graph with a horizontal axis representing the exposure period (shutter speed) and a vertical axis representing the aperture value, and presentation of a recommended setting region that achieves an appropriate exposure period and an appropriate aperture value on this graph. A user can input an appropriate exposure period and an appropriate aperture value by designating one point on the graph with reference to this recommended setting region.

However, Japanese Patent Laid-Open No. 2007-96682 aims at a case where a user sets both of the shutter speed and the aperture value. That is to say, with the technique of Japanese Patent Laid-Open No. 2007-96682, a user cannot intuitively understand changes in setting values in a mode in which other setting values are decided on automatically in accordance with the setting of partial setting values by the user, such as an aperture priority mode and a shutter speed priority mode.

SUMMARY OF THE INVENTION

The present invention has been made in view of the foregoing situation. The present invention provides a technique that enables a user to intuitively understand the influence of a change in one setting value on another setting value in a situation where another setting value is decided on automatically based on one setting value so that a combination of setting values of two exposure control parameters corresponds to predetermined exposure.

According to a first aspect of the present invention, there is provided an exposure setting apparatus, comprising: an obtainment unit configured to obtain a setting value of a first exposure control parameter; a first decision unit configured to decide on a setting value of a second exposure control parameter based on the setting value of the first exposure control parameter so that a combination of the setting value of the first exposure control parameter and the setting value of the second exposure control parameter corresponds to predetermined exposure; and a display control unit configured to perform control to display a coordinate system region, a first indicator, and a second indicator on a display unit, the coordinate system region representing a coordinate system that includes a first axis corresponding to the first exposure control parameter and a second axis corresponding to the second exposure control parameter, the first indicator indicating positions, in the coordinate system region, of a plurality of combinations of a value of the first exposure control parameter and a value of the second exposure control parameter that correspond to the predetermined exposure, the second indicator indicating a position, in the coordinate system region, of the combination of the setting value of the first exposure control parameter and the setting value of the second exposure control parameter.

According to a second aspect of the present invention, there is provided a control method of an exposure setting apparatus, comprising: obtaining a setting value of a first exposure control parameter; deciding on a setting value of a second exposure control parameter based on the setting value of the first exposure control parameter so that a combination of the setting value of the first exposure control parameter and the setting value of the second exposure control parameter corresponds to predetermined exposure; and performing control to display a coordinate system region, a first indicator, and a second indicator on a display unit, the coordinate system region representing a coordinate system that includes a first axis corresponding to the first exposure control parameter and a second axis corresponding to the second exposure control parameter, the first indicator indicating positions, in the coordinate system region, of a plurality of combinations of a value of the first exposure control parameter and a value of the second exposure control parameter that correspond to the predetermined exposure, the second indicator indicating a position, in the coordinate system region, of the combination of the setting value of the first exposure control parameter and the setting value of the second exposure control parameter.

According to a third aspect of the present invention, there is provided a non-transitory computer-readable storage medium which stores a program for causing a computer to execute a control method comprising: obtaining a setting value of a first exposure control parameter; deciding on a setting value of a second exposure control parameter based on the setting value of the first exposure control parameter so that a combination of the setting value of the first exposure control parameter and the setting value of the second exposure control parameter corresponds to predetermined exposure; and performing control to display a coordinate system region, a first indicator, and a second indicator on a display unit, the coordinate system region representing a coordinate system that includes a first axis corresponding to the first exposure control parameter and a second axis corresponding to the second exposure control parameter, the first indicator indicating positions, in the coordinate system region, of a plurality of combinations of a value of the first exposure control parameter and a value of the second exposure control parameter that correspond to the predetermined exposure, the second indicator indicating a position, in the coordinate system region, of the combination of the setting value of the first exposure control parameter and the setting value of the second exposure control parameter.

Further features of the present invention will become apparent from the following description of exemplary embodiments with reference to the attached drawings.

BRIEF DESCRIPTION OF THE DRAWINGS

FIG. 1 is an external view of a digital camera 100.

DESCRIPTION OF THE EMBODIMENTS

Figure 2:
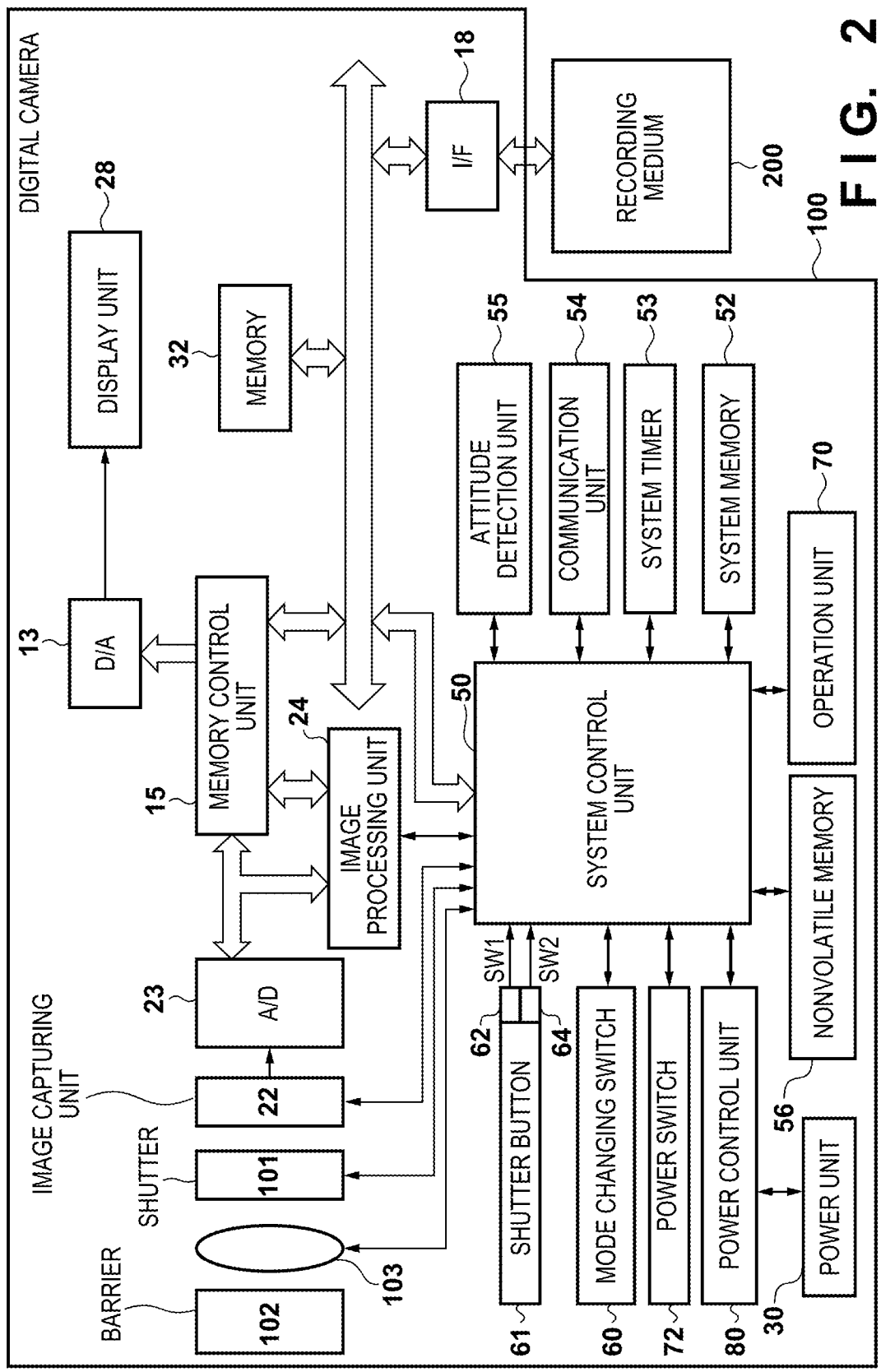
FIG. 2 is a block diagram showing an exemplary configuration of the digital camera 100.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 shows an external view of a digital camera 100 that serves as an example of an exposure setting apparatus (electronic device) to which the present invention can be applied. A display unit 28 is a display unit that displays images and various types of information. A shutter button 61 is an operation unit for issuing a shooting instruction. A mode changing switch 60 is an operation unit for switching among various types of modes. A connector 112 is a connector between a connection cable 111, which is intended to establish connection with an external device, such as a personal computer and a printer, and the digital camera 100. An operation unit 70 is an operation unit that is composed of such operation members as various types of switches, buttons, and a touch panel that accept various types of operations from a user. A controller wheel 73 is an operation member that is included in the operation unit 70 and can be operated by rotation. A power switch 72 is a push button for switching between power-ON and power-OFF. A recording medium 200 is a recording medium, such as a memory card and a hard disk. A recording medium slot 201 is a slot for storing the recording medium 200. The recording medium 200 stored in the recording medium slot 201 can communicate with the digital camera 100, and can perform recording and reproduction. A cover 202 is a cover for the recording medium slot 201. FIG. 1 shows a state in which the cover 202 is open, and a part of the recording medium 200 has been extracted from the recording medium slot 201 and is exposed.

FIG. 2 is a block diagram showing an exemplary configuration of the digital camera 100 according to the present embodiment. In FIG. 2, a photographing lens 103 is a lens group including a zoom lens and a focusing lens. A shutter 101 is a shutter with an aperture function. An image capturing unit 22 is an image sensor composed of, for example, a CCD or CMOS sensor that converts an optical image into an electrical signal. An A/D converter 23 converts an analog signal into a digital signal. The A/D converter 23 is used to convert an analog signal output from the image capturing unit 22 into a digital signal. A barrier 102 covers an image capturing system of the digital camera 100, including the photographing lens 103, so as to prevent the image capturing system including the photographing lens 103, the shutter 101, and the image capturing unit 22 from being soiled or damaged.

An image processing unit 24 performs predetermined pixel interpolation, resizing (e.g., reduction) processing, and color conversion processing with respect to data from the A/D converter 23 or data from a memory control unit 15. The image processing unit 24 also performs predetermined computational processing using captured image data. Based on the computational result obtained by the image processing unit 24, a system control unit 50 performs exposure control and range-finding control. As a result, TTL (through-the-lens) AF (autofocus) processing, AE (automatic exposure) processing, and EF (preliminary flash emission) processing are performed. Furthermore, the image processing unit 24 performs predetermined computational processing using captured image data, and performs TTL AWB (auto white balance) processing based on the obtained computational result.

Output data from the A/D converter 23 is written directly into a memory 32 via the image processing unit 24 and the memory control unit 15, or via the memory control unit 15. The memory 32 stores image data that has been obtained by the image capturing unit 22 and converted into digital data by the A/D converter 23, and image data to be displayed on the display unit 28. The memory 32 has a storage capacity sufficient to store a predetermined number of still images, as well as moving images and audio of a predetermined duration.

The memory 32 also functions as a memory for image display (video memory). A D/A converter 13 converts data for image display stored in the memory 32 into an analog signal, and supplies the analog signal to the display unit 28.

In this way, image data for display that has been written into the memory 32 is displayed by the display unit 28 via the D/A converter 13. The display unit 28 performs display on a display device, such as an LCD, in accordance with an analog signal from the D/A converter 13. Digital signals that have undergone the A/D conversion in the A/D converter 23 and have been accumulated in the memory 32 are converted into analog signals in the D/A converter 13, and then the analog signals are sequentially transferred to and displayed on the display unit 28; in this way, the display unit 28 functions as an electronic viewfinder and can display through-the-lens images. Display of through-the-lens images is also referred to as live-view display (LV display). Hereinafter, images that are displayed in the form of live-view are referred to as live-view images (LV images).

A nonvolatile memory 56 is a memory that serves as an electrically erasable and recordable recording medium; for example, an EEPROM or the like is used thereas. For example, constants and programs for the operations of the system control unit 50 are stored in the nonvolatile memory 56. The programs mentioned here refer to computer programs for executing various types of flowcharts, which will be described later, in the present embodiment.

The system control unit 50 is a control unit that includes at least one processor or circuit, and controls the entirety of the digital camera 100. The system control unit 50 realizes each processing of the present embodiment, which will be described later, by executing a program recorded in the nonvolatile memory 56 mentioned earlier. For example, a RAM is used as a system memory 52. Constants and variables for the operations of the system control unit 50, programs that have been read out from the nonvolatile memory 56, and the like are deployed to the system memory 52. The system control unit 50 also performs display control by controlling the memory 32, the D/A converter 13, the display unit 28, and the like.

A system timer 53 is a time measurement unit that measures the times used in various types of control and the time of a built-in clock.

The mode changing switch 60, the shutter button 61, and the operation unit 70 are operation units for inputting various types of operational instructions to the system control unit 50. The mode changing switch 60 switches an operation mode of the system control unit 50 to one of a still image recording mode, a moving image shooting mode, a reproduction mode, and so on. Examples of modes included in the still image recording mode are an auto shooting mode, an auto scene distinction mode, a manual mode, an aperture priority mode (Av mode), a shutter speed priority mode (Tv mode), and a program AE mode. Other examples are various types of scene modes in which shooting settings are configured separately for each shooting scene, and a custom mode. Using the mode changing switch 60, the user can switch directly to one of these modes. Alternatively, it is permissible to first switch to a shooting mode list screen using the mode changing switch 60, and then select one of a plurality of modes that have been displayed and switch thereto using another operation member. Likewise, the moving image shooting mode may also include a plurality of modes.

A first shutter switch 62 is turned ON and generates a first shutter switch signal SW1 partway through an operation performed on the shutter button 61 provided in the digital camera 100, that is to say, when the button is depressed halfway (a shooting preparation instruction). In response to the first shutter switch signal SW1, the system control unit 50 starts the operations of AF (autofocus) processing, AE (automatic exposure) processing, AWB (auto white balance) processing, EF (preliminary flash emission) processing, and the like.

A second shutter switch 64 is turned ON and generates a second shutter switch signal SW2 upon completion of the operation performed on the shutter button 61, that is to say, when the button is fully depressed (a shooting instruction). In response to the second shutter switch signal SW2, the system control unit 50 starts a series of operations of shooting processing, from reading of signals from the image capturing unit 22 to writing of image data into the recording medium 200.

For example, performing an operation of selecting various types of function icons displayed on the display unit 28 will assign functions to the respective operation members of the operation unit 70 as appropriate on a scene-by-scene basis; as a result, the respective operation members act as various types of function buttons. Examples of the function buttons include an end button, a return button, a next image button, a jump button, a refinement button, an attribute change button, and so on. For example, when a menu button is pressed, a menu screen on which various types of settings can be configured is displayed on the display unit 28. The user can configure various types of settings intuitively using the menu screen displayed on the display unit 28, four directional buttons corresponding to up, down, left, and right, and a SET button.

The controller wheel 73 is an operation member that is included in the operation unit 70 and can be operated by rotation, and is used together with the directional buttons to, for example, issue an instruction regarding an item to be selected. When the controller wheel 73 is operated by rotation, an electrical pulse signal is generated in accordance with the amount of operation, and the system control unit 50 controls each component of the digital camera 100 based on this pulse signal. The angle by which the controller wheel 73 has been operated by rotation, how many times it has been rotated, and the like can be determined using this pulse signal. Note that the controller wheel 73 may be any operation member as long as the rotational operation can be detected. For example, it may be a dial operation member that allows the controller wheel 73 itself to rotate to generate the pulse signal in accordance with the rotational operation performed by the user. Furthermore, it may be an operation member which is composed of a touch sensor, and which does not allow the controller wheel 73 itself to rotate but detects a rotating motion and the like of the user's finger on the controller wheel 73 (a so-called touch wheel).

A power control unit 80 is composed of, for example, a battery detection circuit, a DC-DC converter, and a switch circuit for switching among the blocks to which electric current is supplied, and detects whether a battery is loaded, the battery type, and the remaining battery power. The power control unit 80 also controls the DC-DC converter based on the results of such detection and an instruction from the system control unit 50, and supplies a necessary voltage for a necessary period to the respective components of the digital camera 100, including the recording medium 200. A power unit 30 is composed of a primary battery (e.g., an alkaline battery and a lithium battery), a secondary battery (e.g., a NiCd battery, a NiMH battery, and a lithium-ion battery), an AC adapter, or the like.

A recording medium I/F 18 is an interface with the recording medium 200, which is a memory card, a hard disk, or the like. The recording medium 200 is a recording medium, such as a memory card, for recording shot images, and is composed of a semiconductor memory, an optical disc, a magnetic disk, or the like.

A communication unit 54 connects to an external device wirelessly or via a wired cable, and transmits and receives video signals, audio signals, and the like. The communication unit 54 can also connect to a wireless LAN (Local Area Network) and the Internet. Furthermore, the communication unit 54 can communicate with an external device also via Bluetooth® and Bluetooth Low Energy. The communication unit 54 can transmit images captured by the image capturing unit 22 (including LV images) and images recorded in the recording medium 200, and can also receive image data and other various types of information from an external device.

An attitude detection unit 55 detects the attitude of the digital camera 100 relative to the gravitational direction. Whether an image shot by the image capturing unit 22 is an image that was shot with the digital camera 100 held horizontally or an image that was shot with the digital camera 100 held vertically can be distinguished based on the attitude detected by the attitude detection unit 55. The system control unit 50 can add orientation information corresponding to the attitude detected by the attitude detection unit 55 to an image file of images captured by the image capturing unit 22, record images in a rotated state, and so on. An acceleration sensor, a gyro sensor, or the like can be used as the attitude detection unit 55. It is also possible to detect a motion of the digital camera 100 (e.g., whether the digital camera 100 is panning, tilting, lifted, or stationary) using the acceleration sensor or the gyro sensor serving as the attitude detection unit 55.

Note that the digital camera 100 includes, as a part of the operation unit 70, a touch panel 70a that is capable of detecting contact with the display unit 28. As shown in FIG. 1, the touch panel 70a and the display unit 28 can be configured as an integrated unit. For example, the touch panel 70a is configured to have a light transmittance that does not interfere with display of the display unit 28, and is attached to the top layer of the display surface of the display unit 28. Then, input coordinates of the touch panel 70a are associated with display coordinates on a display screen of the display unit 28. This makes it possible to provide a GUI (graphical user interface) in which the user seems capable of directly manipulating a screen displayed on the display unit 28. The system control unit 50 can detect the following operations or states with respect to the touch panel 70a.

Newly touching the touch panel 70a with a finger or a stylus that had not been touching the touch panel 70a. In other words, this is the start of a touch (hereinafter referred to as a "touch-down").

A state in which a finger or a stylus is touching the touch panel 70a (hereinafter referred to as a "touch-on").

Moving a finger or a stylus while it is touching the touch panel 70a (hereinafter referred to as a "touch-move").

Releasing a finger or a stylus that had been touching the touch panel 70a therefrom. In other words, this is the end of a touch (hereinafter referred to as a "touch-up").

A state in which nothing is touching the touch panel 70a (hereinafter referred to as a "touch-off").

When a touch-down is detected, a touch-on is detected at the same time. A touch-on normally continues to be detected after a touch-down as long as no touch-up is detected. A touch-move being detected is also a state in which a touch-on is detected. Even if a touch-on is detected, a touch-move is not detected as long as the touched position does not move. A touch-off occurs after a touch-up has been detected for all fingers or styluses that had been touching.

These operations/states, as well as the positional coordinates on the touch panel 70a where a finger or a stylus is touching, are communicated to the system control unit 50 through an internal bus. The system control unit 50 determines what type of operation (touch operation) has been made on the touch panel 70a based on the communicated information. With respect to a touch-move, the moving direction of a finger or a stylus moving on the touch panel 70a can also be determined, based on changes in the positional coordinates, for each of a vertical component and a horizontal component on the touch panel 70a.

It is assumed that when a touch-move of a predetermined distance or longer has been detected, it is determined that a slide operation has been performed. An operation of rapidly moving a finger by a certain distance while the finger is touching the touch panel 70a and then releasing the finger therefrom is called a flick. In other words, a flick is a rapid tracing operation in which the touch panel 70a is flicked with a finger. When a touch-up is detected directly after detection of a touch-move of a predetermined distance or longer and a predetermined speed or higher, it can be determined that a flick has been performed (it can be determined that a flick has been performed following a slide operation). Furthermore, in a case where a plurality of locations (e.g., two points) are touched at the same time, a touch operation of moving the touched positions closer to each other is called a "pinch-in", whereas a touch operation of moving the touched positions apart from each other is called a "pinch-out". A pinch-out and a pinch-in are collectively referred to as pinch operations (or simply "pinch").

Any of a variety of types of touch panels, such as a resistive film type, a capacitance type, a surface acoustic wave type, an infrared type, an electromagnetic induction type, an image recognition type, and an optical sensor type, may be used as the touch panel 70a. Depending on the type, a touch is detected when contact is made with the touch panel, or a touch is detected when a finger or a stylus has approached the touch panel; either of these types may be used.

Below is a detailed description of the setting of exposure conditions using the exposure setting apparatus (digital camera 100) of FIG. 1. First, a description is given of a case where the shutter speed is decided on automatically based on another setting, such as a case where the "aperture priority mode" is set as an image capturing mode.

Figure 3A:
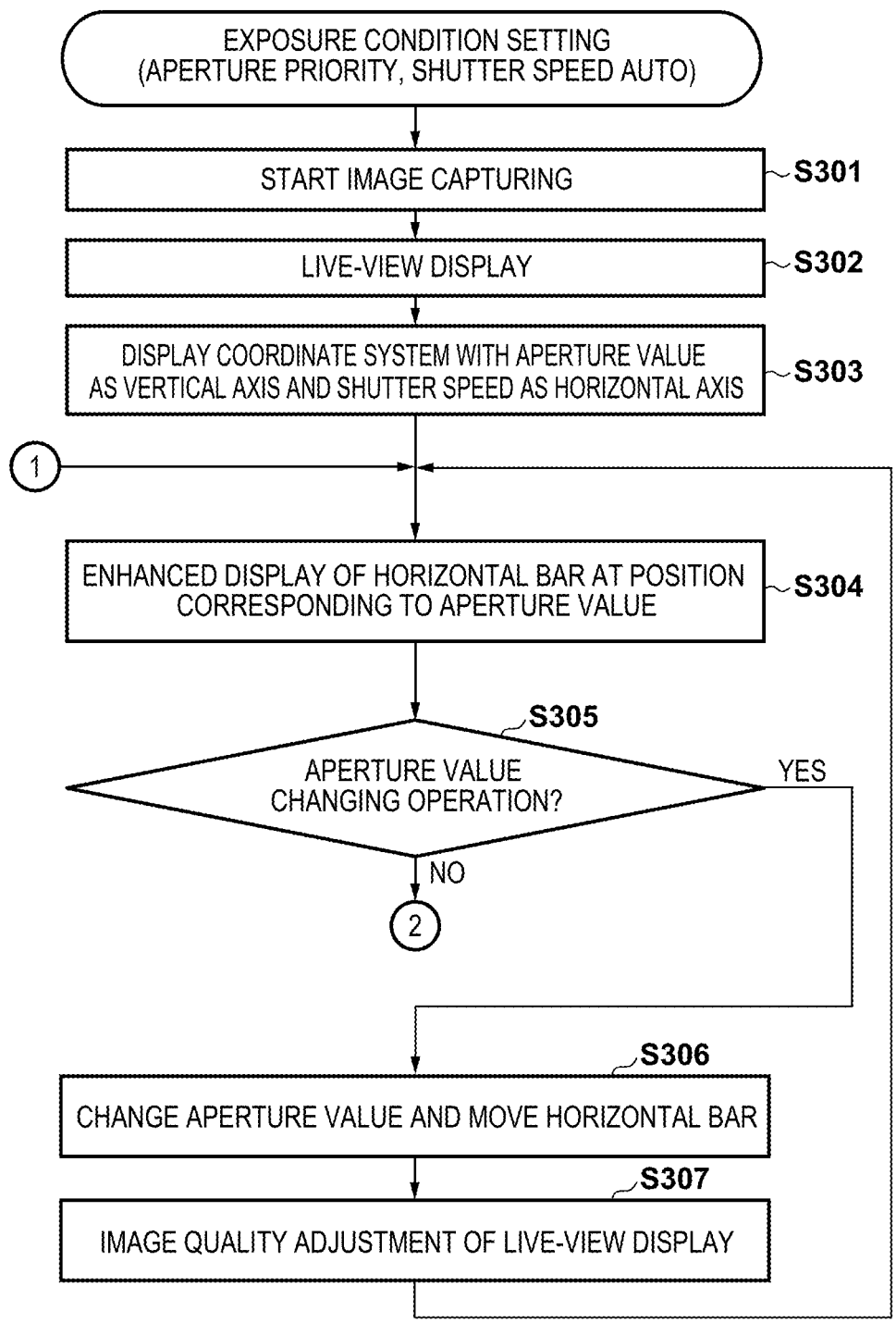
FIGS. 3A to 3C are a flowchart showing the flow of the setting of exposure conditions in an aperture priority mode.
Figure 3B:
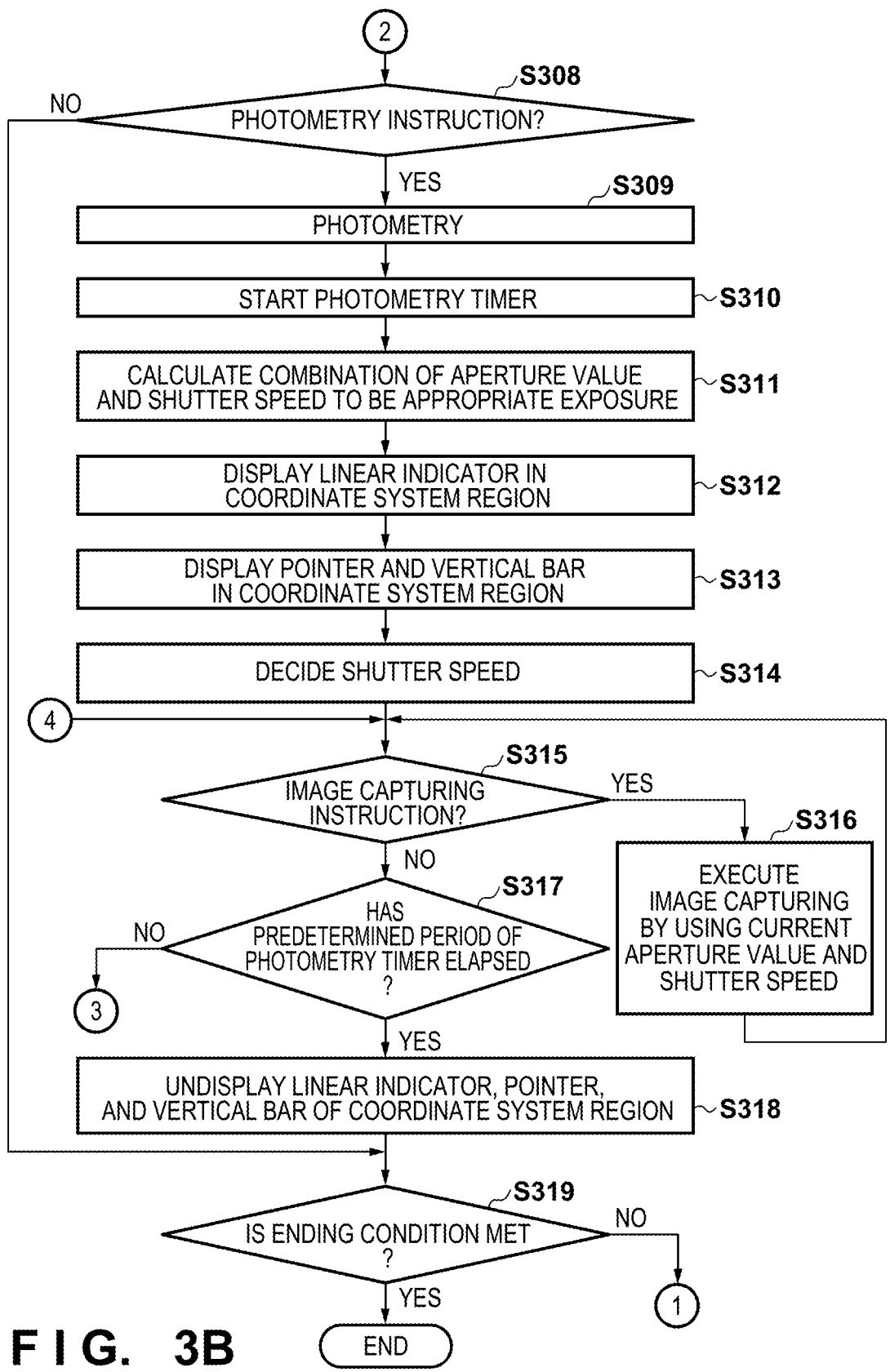
Figure 3C:
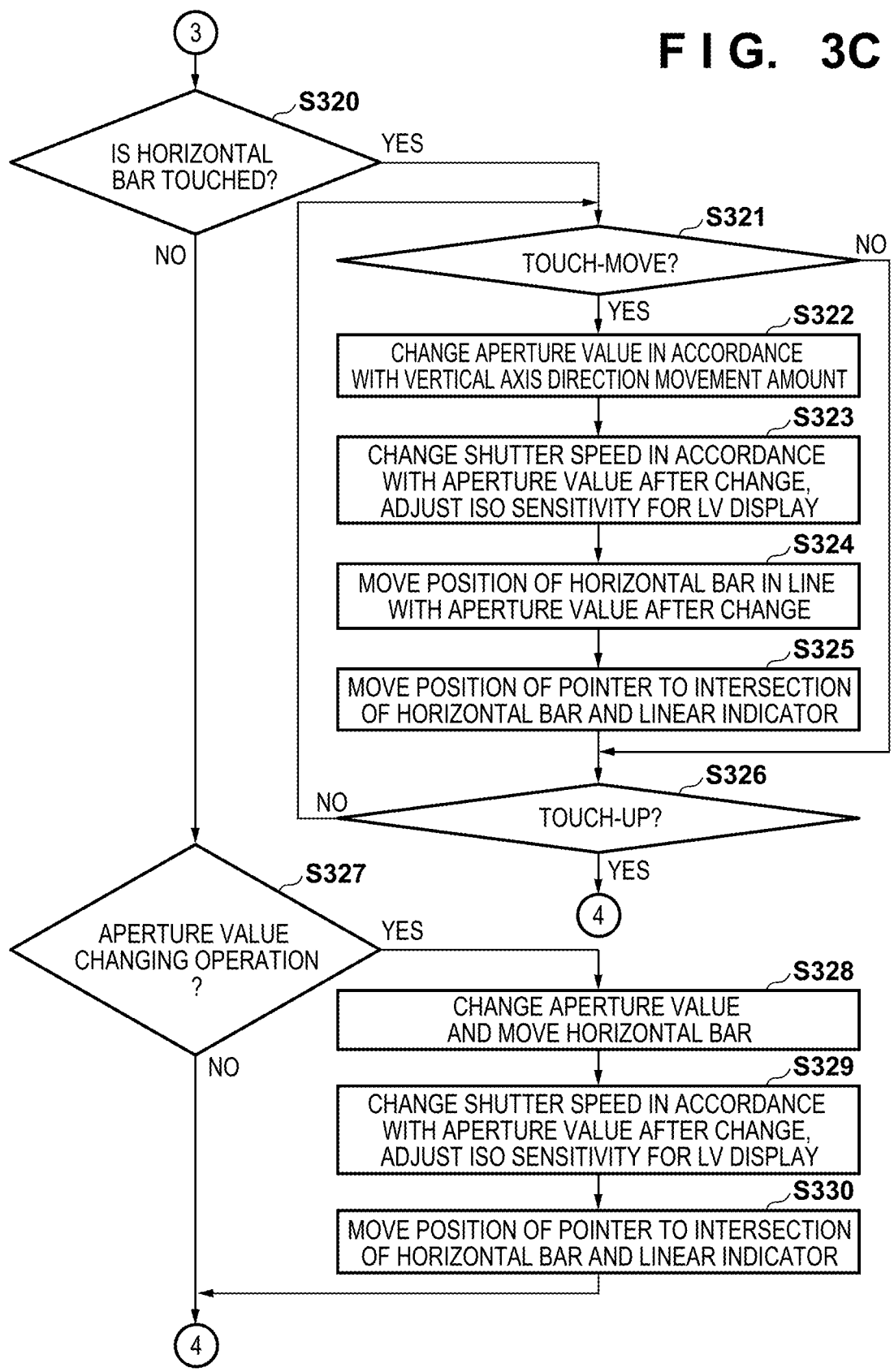

FIGS. 3A to 3C are a flowchart showing the flow of the setting of exposure conditions in the aperture priority mode using the exposure setting apparatus (digital camera 100) of FIG. 1. Processing of respective steps of the present flowchart is realized as the system control unit 50 of the digital camera 100 deploys a processing program recorded in the nonvolatile memory 56 to the system memory 52 and executing the processing program, unless specifically stated otherwise. Processing of the present flowchart is started when a user turns ON the power of the digital camera 100 and sets the aperture priority mode as the image capturing mode.

In step S301, the system control unit 50 starts image capturing for LV display under predetermined image capturing setting conditions, for example, predetermined focus, exposure, white balance, aperture value, shutter speed, and ISO sensitivity. For example, various types of conditions that were set before the power was turned OFF are restored and used as the predetermined image capturing setting conditions; this, however, depends on the specification of the digital camera 100.

In step S302, the system control unit 50 performs LV display by displaying the video that is being captured by the image capturing unit 22 on the display unit 28 (touch display).

Figure 4A:
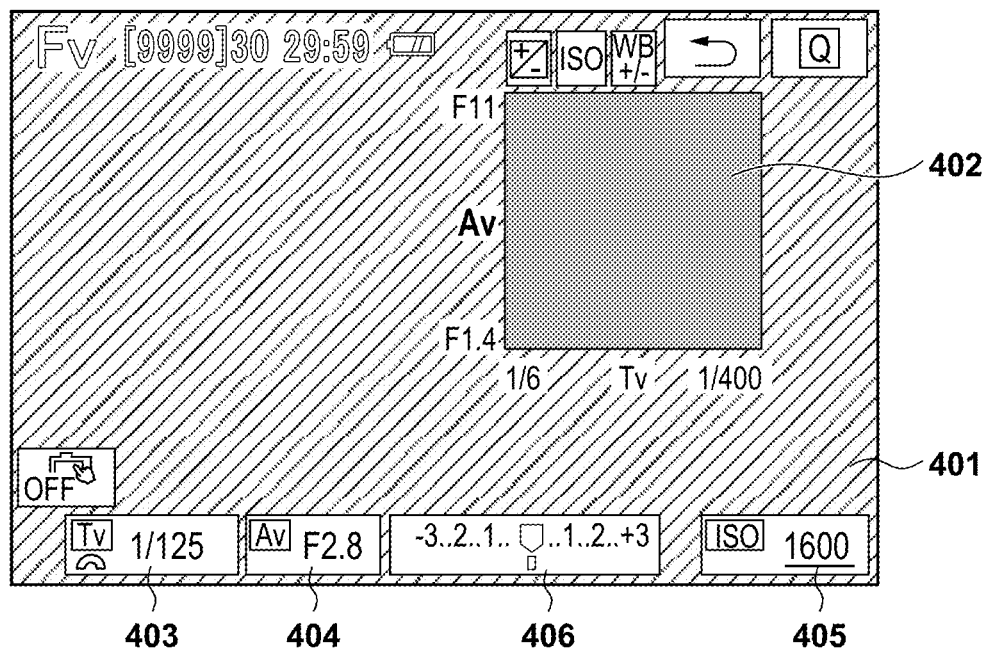
FIG. 4A is a diagram showing a screen that is displayed on a display unit 28 in step S303 of FIG. 3A.

In step S303, the system control unit 50 displays a coordinate system with a vertical axis representing the aperture value and a horizontal axis representing the shutter speed on the display unit 28 (touch display). FIG. 4A is a screen that is displayed on the display unit 28 in step S303; 401 denotes live-view display, 402 denotes a coordinate system region, 403 denotes shutter speed display, 404 denotes aperture display, 405 denotes ISO sensitivity display, and 406 denotes exposure level display.

In step S304, the system control unit 50 displays a horizontal bar (a first line segment parallel to the horizontal axis) at a position corresponding to the current setting value of the aperture within the coordinate system region 402 displayed in step S303. The "current setting value of the aperture" mentioned here is the setting value for main shooting. The aperture value that is used in image capturing for LV display is not always the same as the setting value for main shooting. It is assumed that in the following description, when the term "setting value" is used with respect to an exposure control parameter, such as the aperture value and the shutter speed, it refers to a value that has been set as a value of an exposure control parameter that is used in main shooting. The system control unit 50 can obtain the aperture value that was used in the previous main shooting from, for example, the nonvolatile memory 56 as the current setting value of the aperture.

Figure 4B:
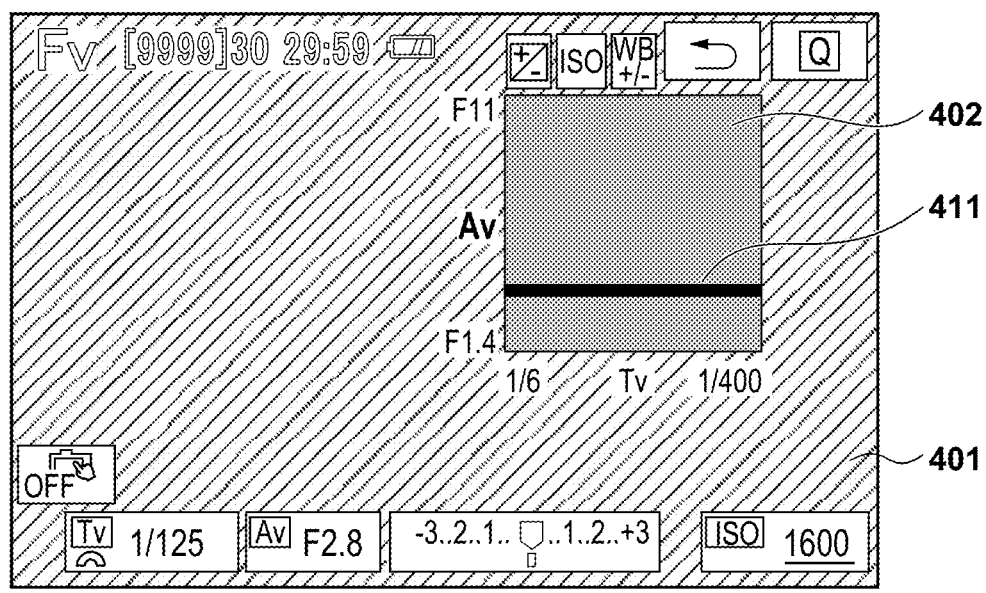
FIG. 4B is a diagram showing a screen that is displayed on the display unit 28 in step S304 of FIG. 3A.

FIG. 4B is a screen that is displayed on the display unit 28 in step S304; 411 denotes the horizontal bar. As a result of executing processing of step S304 following step S303, the state of the display unit 28 makes a transition from FIG. 4A to FIG. 4B. Here, the system control unit 50 displays the horizontal bar 411 in an enhanced manner by, for example, giving a specific color (e.g., orange) to the horizontal bar 411, displaying the horizontal bar 411 as a thick bar, or surrounding the horizontal bar 411 with a line. This enhanced display is performed with an intention to allow the user to recognize that the aperture value indicated by the horizontal bar 411 can be changed directly by a user operation.

In step S305, the system control unit 50 determines whether the user has performed an aperture value changing operation by, for example, operating a diaphragm ring (not shown) of the lens. When it is determined that the aperture value changing operation has been performed, processing proceeds to step S306; otherwise, processing proceeds to step S308.

In step S306, the system control unit 50 changes the aperture value (the setting value for main shooting) in accordance with the substance of the aperture value changing operation (e.g., the direction and the amount of the operation performed on the diaphragm ring), moves the position of the horizontal bar 411 in the coordinate system region 402 to the position corresponding to the changed aperture value, and displays the resultant horizontal bar 411.

In step S307, the system control unit 50 adjusts the display image quality of live-view display so that live-view display is performed with good visibility also under the changed aperture value. Thereafter, processing returns to step S304.

Meanwhile, in step S308, the system control unit 50 determines whether a photometry instruction has been issued, for example, the user has performed so-called halfway depression of the shutter button 61 (an instruction for image capturing preparation operations). When it is determined that the photometry instruction has been issued, processing proceeds to step S309; otherwise, processing proceeds to step S319.

In step S309, the system control unit 50 performs "photometry" in which the brightness of a subject is measured. In step S310, the system control unit 50 starts a photometry timer T1. The photometry timer T1 is intended to measure a period for continuing the photometry for a predetermined period since the issuance of the photometry instruction.

In step S311, using a known AE (automatic exposure) processing algorithm, the system control unit 50 calculates a plurality of combinations of the aperture value and the shutter speed that achieve appropriate exposure. Note that there is a case where the user wishes to intentionally perform image capturing with exposure that is different from the appropriate exposure. Therefore, to put it in a more general manner, the system control unit 50 decides on predetermined exposure based on the result of measuring the brightness of the subject (photometry), and calculates a plurality of combinations of the aperture value and the shutter speed that correspond to the predetermined exposure.

In step S312, the system control unit 50 displays a line segment corresponding to the plurality of combinations that were calculated in step S311 as a linear indicator in the coordinate system region 402. Therefore, the linear indicator indicates the positions, in the coordinate system region 402, of the plurality of combinations of the aperture value and the shutter speed that correspond to the predetermined exposure (e.g., the appropriate exposure). In step S313, the system control unit 50 displays a pointer at an intersection between the linear indicator displayed in step S312 and the horizontal bar 411 displayed at the position corresponding to the current aperture value. The system control unit 50 also displays a vertical bar (a second line segment parallel to the vertical axis) that passes through the intersection (the position of the pointer).

Figure 4C:
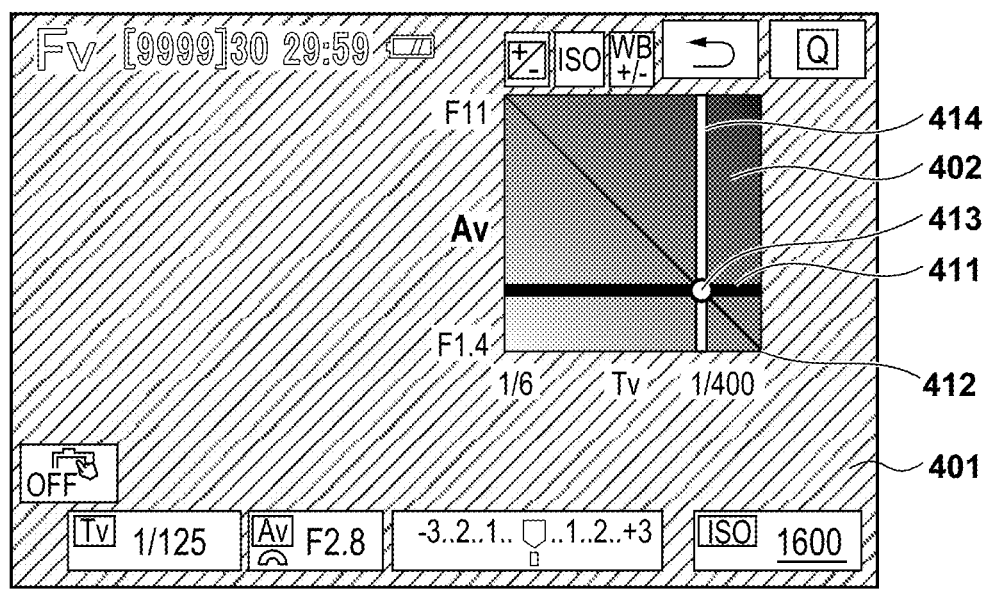
FIG. 4C is a diagram showing a screen that is displayed on the display unit 28 through processing of steps S312 and S313 of FIG. 3B.

FIG. 4C is a screen that is displayed on the display unit 28 through processing of steps S312 and S313; 412 denotes the linear indicator, 413 denotes the pointer, and 414 denotes the vertical bar. Here, the background of the coordinate system region 402 is displayed in the form of gradation (a change in tones) in which the brightness or saturation is high on the upper-right side and low on the lower-left side. This is intended to create an advantageous effect of allowing the user to intuitively recognize that the exposure level decreases (the darkness increases) as the pointer 413 moves toward the upper-right side of the coordinate system region 402, and that the exposure level increases (the brightness increases) as the pointer 413 moves toward the lower-left side of the coordinate system region 402.

As can be understood from FIG. 4C, the system control unit 50 performs control to successively display a plurality of images that are generated through continuous image capturing for LV display as LV images on the display unit 28, together with the coordinate system region 402, the linear indicator 412, and the pointer 413. This is intended to allow the user to set a combination of, for example, the shutter speed and the aperture value (exposure conditions) in a visually easy-to-understand manner while checking the composition (the location of the subject, the percentage of the size of the subject in the total size, etc.) on LV display. That is to say, according to the present embodiment, the user can set a combination of exposure conditions in an easy-to-understand manner while checking the composition.

Note that it is permissible for the linear indicator 412 (a first indicator) to have a line width, include a curved/bent line, and have a pattern and the like. Also, it is permissible for the pointer 413 (a second indicator) to have a shape, a pattern, and the like. Furthermore, in the example of FIG. 4C, as the linear indicator 412 is a continuous line segment, its external appearance connects the positions, in the coordinate system region 402, of the plurality of combinations of the aperture value and the shutter speed that correspond to the predetermined exposure (e.g., the appropriate exposure). However, instead of the indicator that connects these positions, discrete (discontinuous) indicators that do not connect these positions may be used.

As can be understood from the order of processing of steps S309, S311, and S312, the system control unit 50 measures the brightness of the subject, decides on the predetermined exposure (e.g., the appropriate exposure) based on the measurement result, and displays the linear indicator 412 in accordance with the decision of the predetermined exposure.

In step S314, the system control unit 50 decides on the shutter speed corresponding to the position of the vertical bar 414 that passes through the pointer 413 as a setting value of the shutter speed for main shooting.

In step S315, the system control unit 50 determines whether an image capturing instruction has been issued, for example, the user has pressed down the shutter button 61. When it is determined that the image capturing instruction has been issued, processing proceeds to step S316; otherwise, processing proceeds to step S317.

In step S316, the system control unit 50 executes image capturing using the current aperture value and shutter speed (the setting value of the aperture and the setting value of the shutter speed for main shooting that correspond to the position of the pointer 413).

In step S317, the system control unit 50 determines whether the photometry timer T1 indicates the elapse of the predetermined period. When it is determined that the predetermined period has elapsed, processing proceeds to step S318; otherwise, processing proceeds to step S320.

In step S318, the system control unit 50 places the linear indicator 412, the pointer 413, and the vertical bar 414 of the coordinate system region 402 in a non-display state. In step S319, the system control unit 50 makes a determination regarding an ending condition, such as power-OFF. When it is determined that the ending condition has been met, processing of the present flowchart ends; otherwise, processing returns to step S304.

When it is determined that the photometry timer T1 does not indicate the elapse of the predetermined period in step S317, the system control unit 50 determines whether the user has touched the horizontal bar 411 of the coordinate system region 402 in step S320. When it is determined that the user has touched the horizontal bar 411, processing proceeds to step S321; otherwise, processing proceeds to step S327.

In step S321, the system control unit 50 determines whether the user has performed a touch-move. When it is determined that the user has performed a touch-move, processing proceeds to step S322; otherwise, processing proceeds to step S326.

In step S322, the system control unit 50 changes the aperture value (the setting value for main shooting) in accordance with the amount of movement of the touch in the vertical axis direction (the direction perpendicular to the horizontal axis) during the touch-move (slide operation). As the user can change the aperture value via the slide operation in this way, the user can set exposure conditions while intuitively understanding the relationship between the aperture value and the shutter speed. Here, as the display unit 28 of the digital camera 100 normally has a size of only 3 inches or so, it is not very easy for the user to perform the slide operation in the intended direction in the coordinate system region 402. In view of this, the system control unit 50 performs control so that, when the slide operation has been performed by touching the horizontal bar 411 first, the horizontal bar 411 moves in the up-and-down direction based on the amount of movement in the vertical axis direction, and even if the slide operation has been performed (partially) in the left-and-right direction, the amount of movement in the horizontal axis direction does not contribute to the movement of the horizontal bar 411.

In step S323, the system control unit 50 changes the shutter speed (the setting value for main shooting) in accordance with the changed aperture value. This change is made so that a combination of the changed aperture value and shutter speed corresponds to the appropriate exposure (the predetermined exposure). Furthermore, based on the aperture value and the shutter speed that are used in continuous image capturing for LV display, the system control unit 50 adjusts the value of the ISO sensitivity for LV display so that the image quality of LV images approaches the image quality of an image to be generated through image capturing that is performed using the setting values of the aperture, the shutter speed, and the ISO sensitivity for main shooting.

In step S324, the system control unit 50 moves the display position of the horizontal bar 411 in line with the changed aperture value. In step S325, the system control unit 50 changes the display position of the pointer 413 in such a manner that it moves on the linear indicator 412 (moves along the linear indicator 412) to the position of the intersection between the moved horizontal bar 411 and the linear indicator 412. With this visual movement on the linear indicator 412 from the display position before the change to the display position after the change, the user can understand the influence of the change in the aperture value that is made by the user operation on the shutter speed in a more intuitive manner.

Figure 5A:
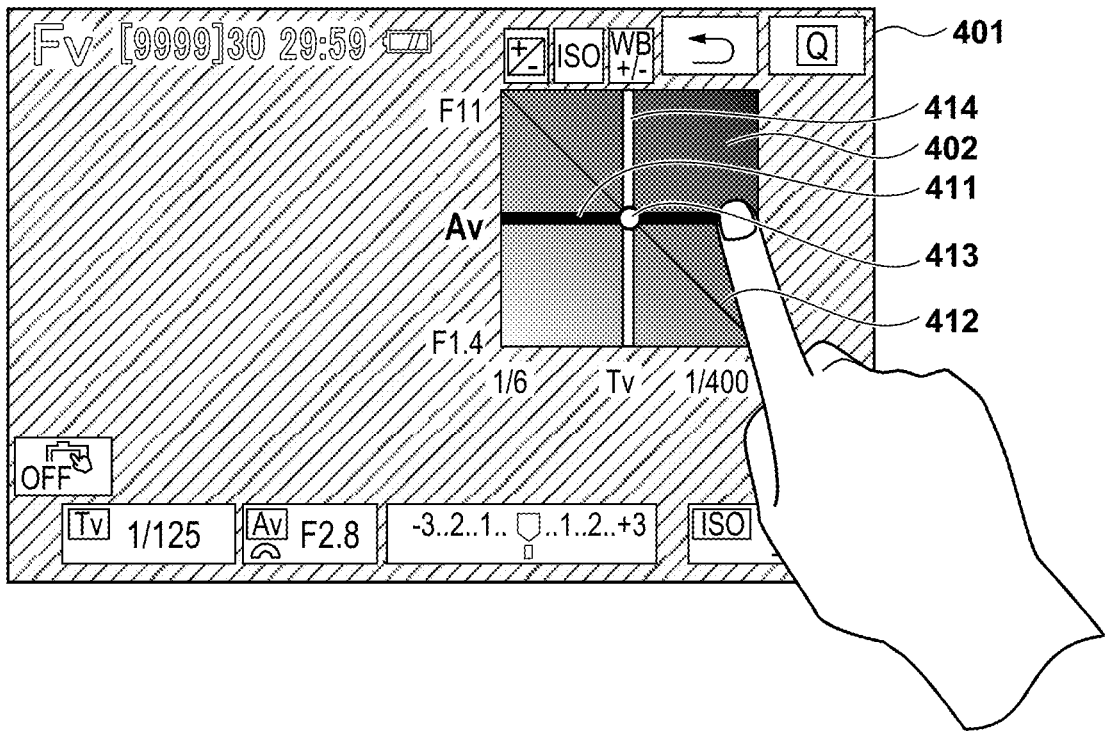
FIG. 5A is a diagram showing a screen that is displayed on the display unit 28 through processing of steps S322 to S325 of FIG. 3C.

FIG. 5A is a screen that is displayed on the display unit 28 through processing of steps S322 to S325. As can be understood from comparison with FIG. 4C, the position of the horizontal bar 411 has moved in line with the changed aperture value, and the position of the vertical bar 414 indicating the shutter speed has moved (as a result of changing the shutter speed in accordance with the changed aperture value). Then, the position of the pointer 413 has been moved to and displayed at the intersection between the horizontal bar 411 and the linear indicator 412. Due to such display, when the shutter speed is decided on automatically in accordance with a change in the aperture value, how this decision is made in terms of relationships among respective elements displayed in the coordinate system region 402 can be presented in a visually easy-to-understand manner. Furthermore, as the setting of the aperture value can be changed by directly operating the horizontal bar 411 indicating the aperture value, intuitive and easy-to-understand operability is realized.

In step S326, the system control unit 50 determines whether the user has performed a touch-up. When it is determined that the user has performed a touch-up, processing returns to step S315; otherwise, processing returns to step S321.

When it is determined that the user has not touched the horizontal bar 411 in step S320, the system control unit 50 determines whether the user has performed the aperture value changing operation by, for example, operating the diaphragm ring of the lens in step S327. When it is determined that the aperture value changing operation has been performed, processing proceeds to step S328; otherwise, processing returns to step S315.

In step S328, the system control unit 50 changes the aperture value in accordance with the substance of the aperture value changing operation (e.g., the direction and the amount of the operation performed on the diaphragm ring), moves the position of the horizontal bar 411 in the coordinate system region 402 to the position corresponding to the changed aperture value, and displays the resultant horizontal bar 411.

In step S329, the system control unit 50 changes the shutter speed in accordance with the changed aperture value. This change is made so that a combination of the changed aperture value and shutter speed corresponds to the appropriate exposure (the predetermined exposure). Furthermore, based on the aperture value and the shutter speed that are used in continuous image capturing for LV display, the system control unit 50 adjusts the value of the ISO sensitivity for LV display so that the image quality of LV images approaches the image quality of an image to be generated through image capturing that is performed using the setting values of the aperture, the shutter speed, and the ISO sensitivity for main shooting.

In step S330, the system control unit 50 changes the display position of the pointer 413 in such a manner that it moves on the linear indicator 412 (moves along the linear indicator 412) to the position of the intersection between the moved horizontal bar 411 and the linear indicator 412. With this visual movement on the linear indicator 412 from the display position before the change to the display position after the change, the user can understand the influence of the change in the aperture value that is made by the user operation on the shutter speed in a more intuitive manner.

Figure 5B:
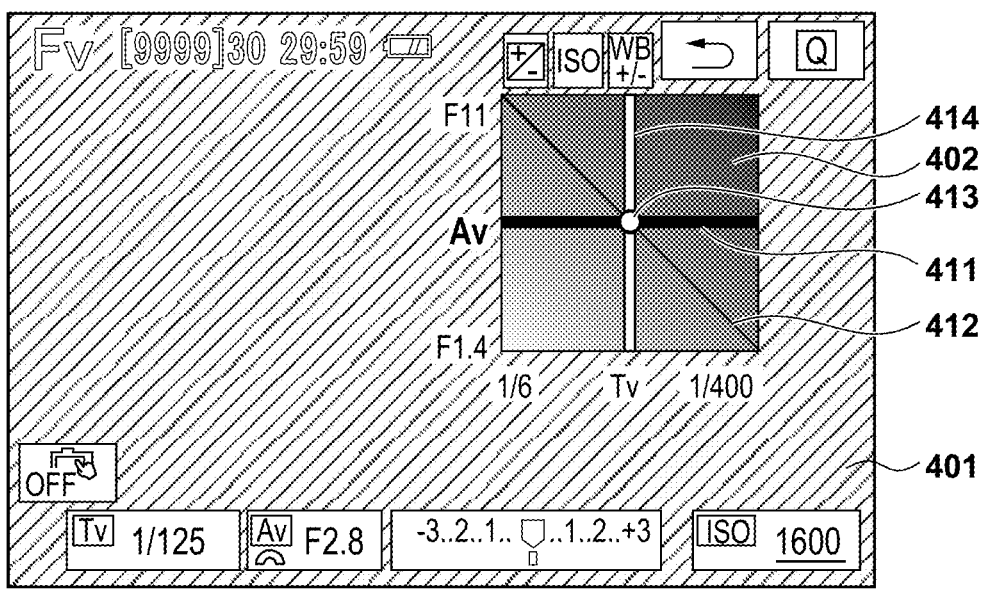
FIG. 5B is a diagram showing a screen that is displayed on the display unit 28 through processing of steps S328 to S330 of FIG. 3C.

FIG. 5B is a screen that is displayed on the display unit 28 through processing of steps S328 to S330. As can be understood from comparison with FIG. 4C, the position of the horizontal bar 411 has moved in line with the changed aperture value, and the position of the vertical bar 414 indicating the shutter speed has moved (as a result of changing the shutter speed in accordance with the changed aperture value). Then, the position of the pointer 413 has been moved to and displayed at the intersection between the horizontal bar 411 and the linear indicator 412. Due to such display, when the shutter speed is decided on automatically in accordance with a change in the aperture value, how this decision is made in terms of relationships among respective elements displayed in the coordinate system region 402 can be presented in a visually easy-to-understand manner.

Next, a description is given of a case where the aperture value is decided on automatically based on another setting, such as a case where the "shutter speed priority mode" is set as the image capturing mode.

Figure 6A:
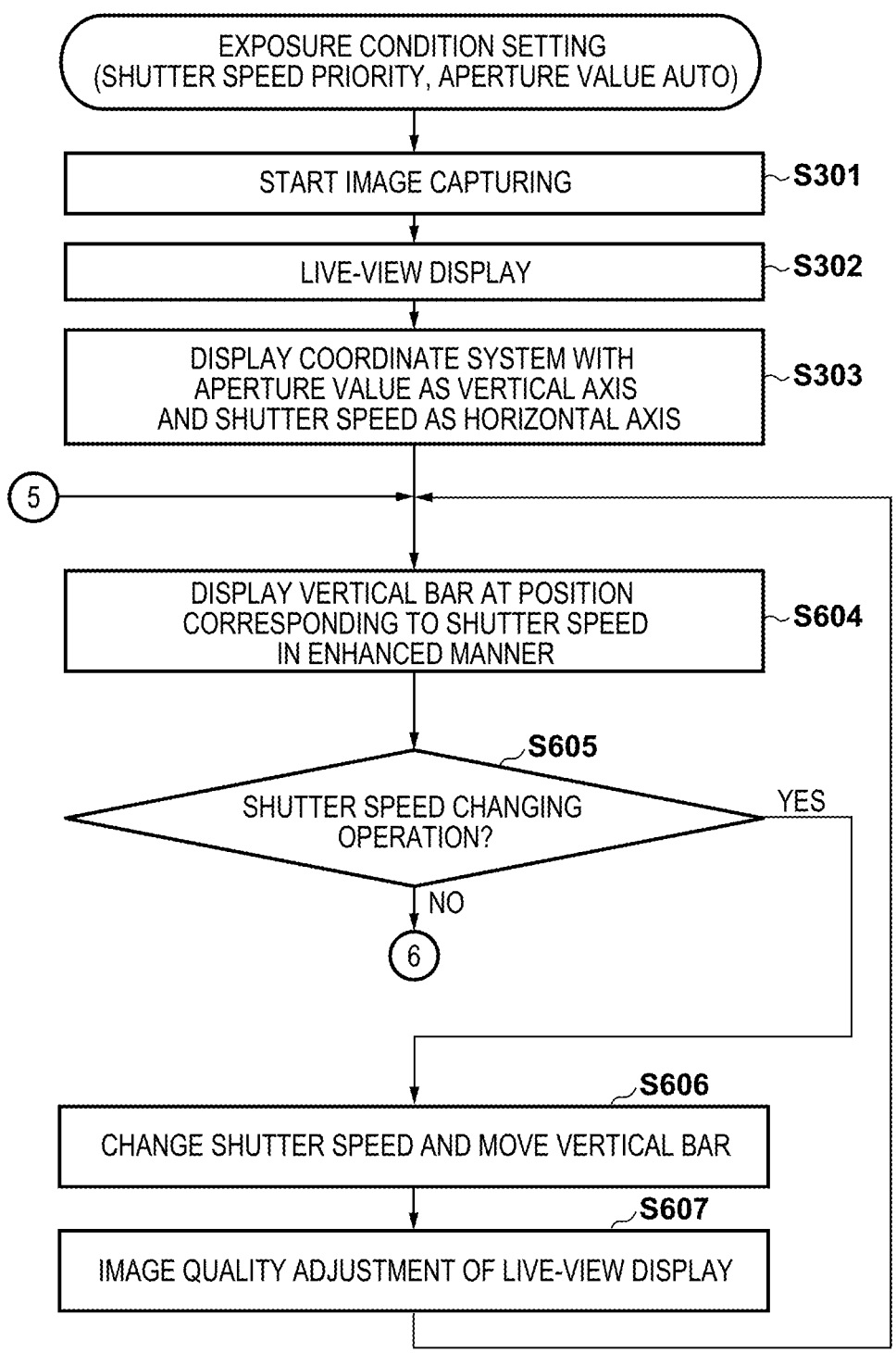
FIGS. 6A to 6C are a flowchart showing the flow of the setting of exposure conditions in a shutter speed priority mode.
Figure 6B:
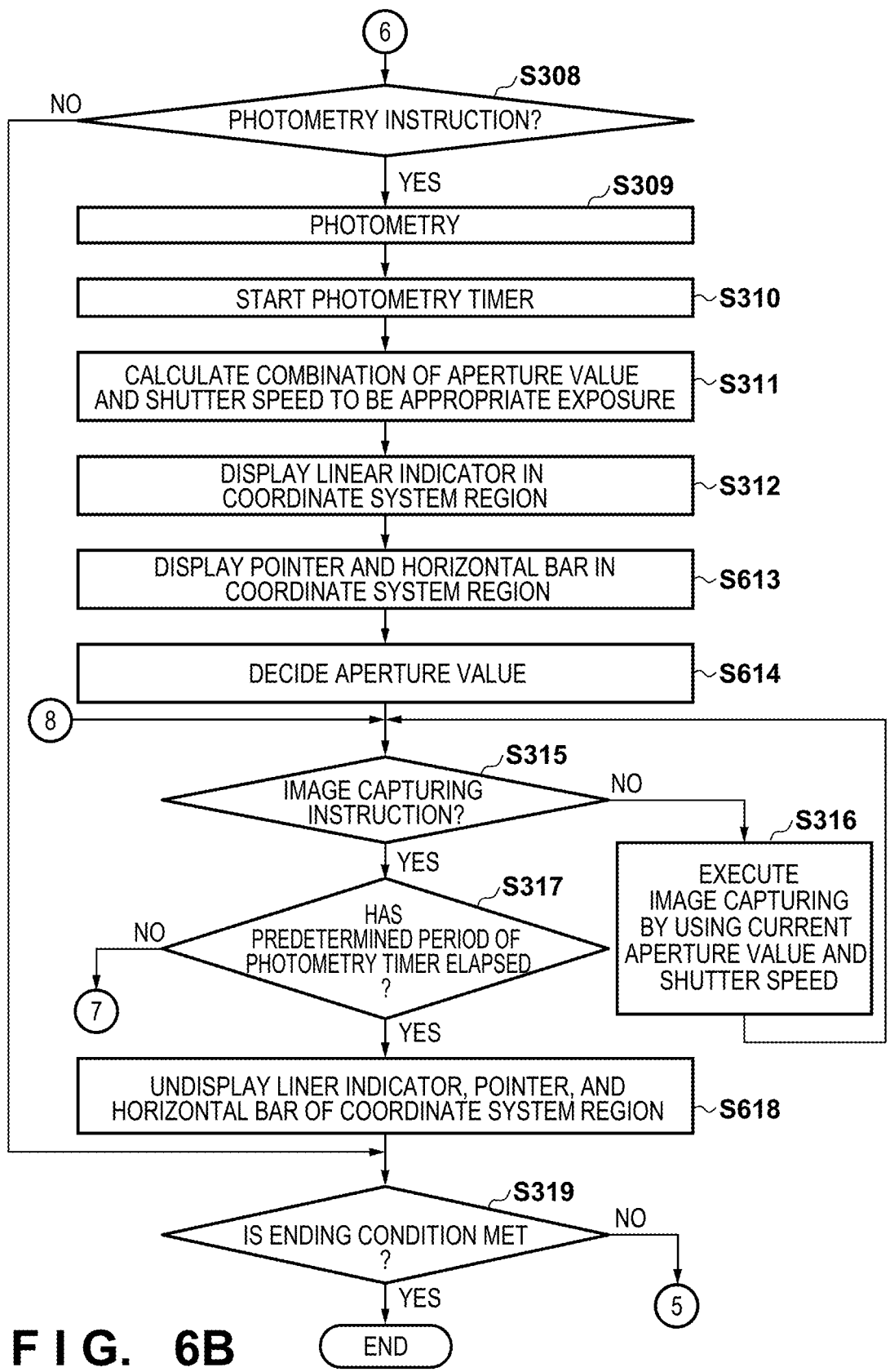
Figure 6C:
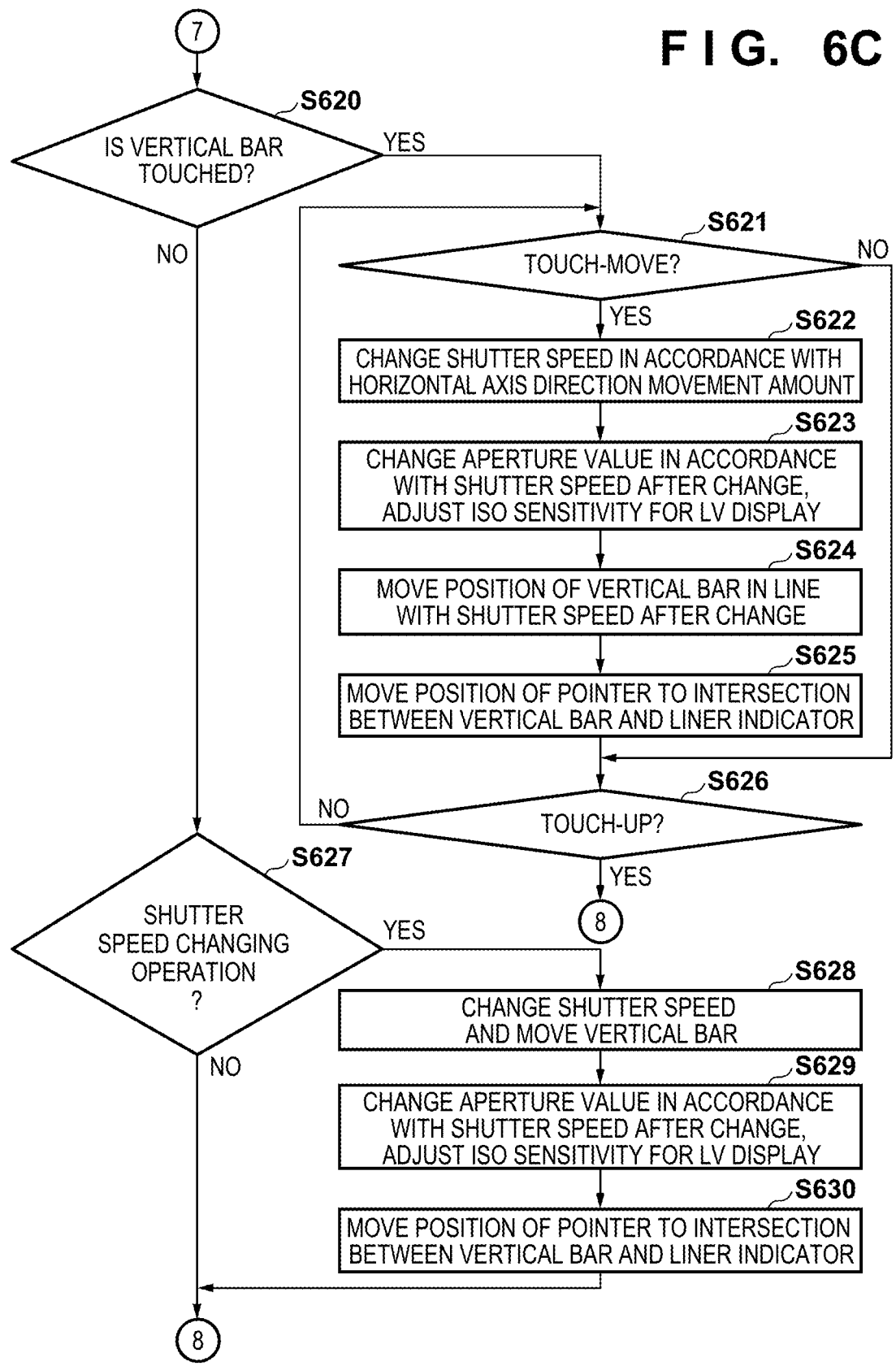

FIGS. 6A to 6C are a flowchart showing the flow of the setting of exposure conditions in the shutter speed priority mode using the exposure setting apparatus (digital camera 100) of FIG. 1. Processing of respective steps of the present flowchart is realized as the system control unit 50 of the digital camera 100 deploys a processing program recorded in the nonvolatile memory 56 to the system memory 52 and executing the processing program, unless specifically stated otherwise. In FIG. 6A to FIG. 6C, the steps in which processing that is the same as or similar to processing of FIG. 3A to 3C are given the same reference signs as in FIG. 3A to FIG. 3C. Processing of the present flowchart is started when a user turns ON the power of the digital camera 100 and sets the shutter speed priority mode as the image capturing mode.

Figure 7A:
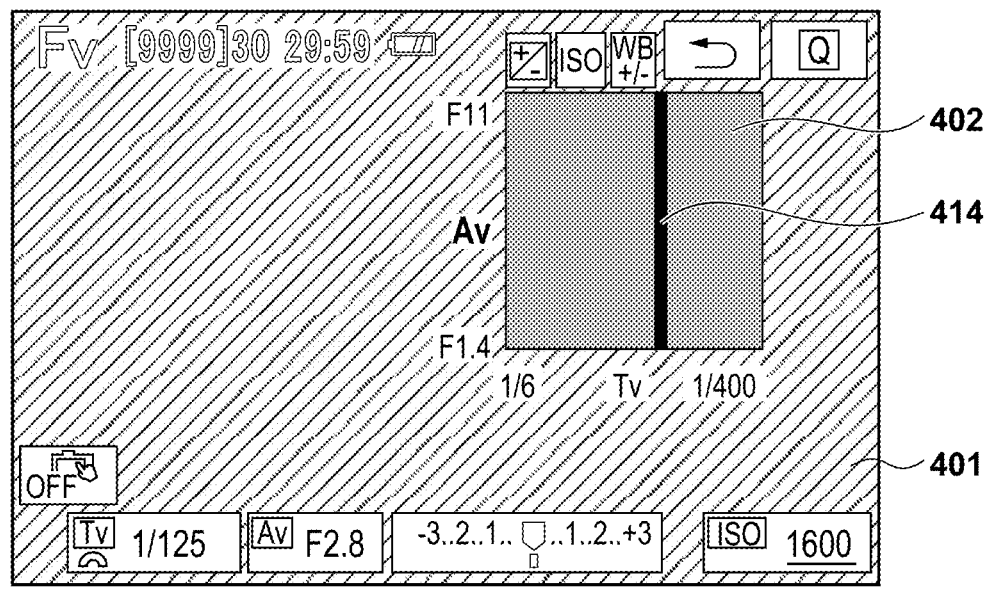
FIG. 7A is a diagram showing a screen that is displayed on the display unit 28 in step S604 of FIG. 6A.

Following the display of the coordinate system in step S303 (see FIG. 4A), in step S604, the system control unit 50 displays a vertical bar at the position corresponding to the current shutter speed within the coordinate system region 402 displayed in step S303. FIG. 7A is a screen that is displayed on the display unit 28 in step S604; 414 denotes the vertical bar. As a result of executing processing of step S604 following step S303, the state of the display unit 28 makes a transition from FIG. 4A to FIG. 7A. Here, the system control unit 50 displays the vertical bar 414 in an enhanced manner by, for example, giving a specific color (e.g., orange) to the vertical bar 414, displaying the vertical bar 414 as a thick bar, or surrounding the vertical bar 414 with a line. This enhanced display is performed with an intention to allow the user to recognize that the shutter speed indicated by the vertical bar 414 can be changed directly by a user operation.

In step S605, the system control unit 50 determines whether the user has performed a shutter speed changing operation by, for example, operating a shutter speed setting dial (not shown). When it is determined that the shutter speed changing operation has been performed, processing proceeds to step S606; otherwise, processing proceeds to step S608.

In step S606, the system control unit 50 changes the shutter speed (the setting value for main shooting) in accordance with the substance of the shutter speed changing operation (e.g., the direction and the amount of the operation performed on the shutter speed setting dial). Then, the system control unit 50 moves the position of the vertical bar 414 in the coordinate system region 402 to the position corresponding to the changed shutter speed, and displays the resultant vertical bar 414.

In step S607, the system control unit 50 adjusts the display image quality of live-view display so that live-view display is performed with good visibility also under the changed shutter speed. Thereafter, processing returns to step S604.

Meanwhile, when processing proceeds from step S605 to step S613 via steps S308 to S312, the system control unit 50 displays a pointer at an intersection between a linear indicator displayed in step S312 and the vertical bar 414 displayed at the position corresponding to the current shutter speed. The system control unit 50 also displays a horizontal bar that passes through the intersection (the position of the pointer).

Figure 7B:
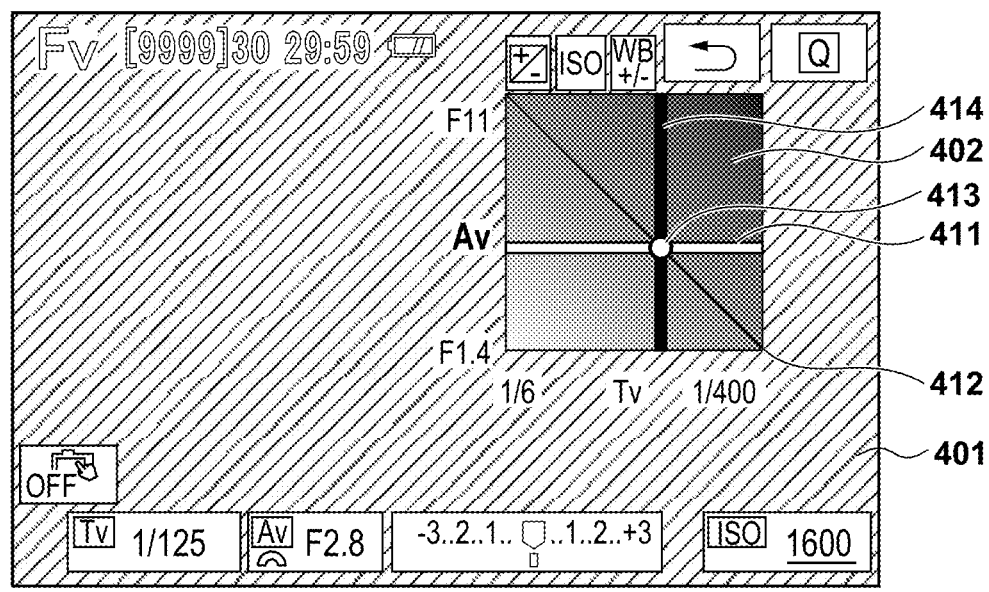
FIG. 7B is a diagram showing a screen that is displayed on the display unit 28 through processing of steps S312 and S613 of FIG. 6A and FIG. 6B.

FIG. 7B is a screen that is displayed on the display unit 28 through processing of steps S312 and S613; 411 denotes the horizontal bar, 412 denotes the linear indicator, and 413 denotes the pointer. Here, the background of the coordinate system region 402 is displayed in the form of gradation (a change in tones) in which the brightness or saturation is high on the upper-right side and low on the lower-left side. This is intended to create an advantageous effect of allowing the user to intuitively recognize that the exposure level decreases (the darkness increases) as the pointer 413 moves toward the upper-right side of the coordinate system region 402, and that the exposure level increases (the brightness increases) as the pointer 413 moves toward the lower-left side of the coordinate system region 402.

Note that it is permissible for the linear indicator 412 (the first indicator) to have a line width, include a curved/bent line, and have a pattern and the like. Also, it is permissible for the pointer 413 (the second indicator) to have a shape, a pattern, and the like. Furthermore, in the example of FIG. 7B, as the linear indicator 412 is a continuous line segment, its external appearance connects the positions, in the coordinate system region 402, of the plurality of combinations of the aperture value and the shutter speed that correspond to the predetermined exposure (e.g., the appropriate exposure). However, instead of the indicator that connects these positions, discrete (discontinuous) indicators that do not connect these positions may be used.

In step S614, the system control unit 50 decides on the aperture value corresponding to the position of the horizontal bar 411 that passes through the pointer 413 as a setting value of the aperture for main shooting.

When processing has proceeded to step S618 via steps S315 and S317, the system control unit 50 places the horizontal bar 411, the linear indicator 412, and the pointer 413 of the coordinate system region 402 in a non-display state.

When it is determined that the photometry timer T1 does not indicate the elapse of the predetermined period in step S317, the system control unit 50 determines whether the user has touched the vertical bar 414 of the coordinate system region 402 in step S620. When it is determined that the user has touched the vertical bar 414, processing proceeds to step S621; otherwise, processing proceeds to step S627.

In step S621, the system control unit 50 determines whether the user has performed a touch-move. When it is determined that the user has performed a touch-move, processing proceeds to step S622; otherwise, processing proceeds to step S626.

In step S622, the system control unit 50 changes the shutter speed (the setting value for main shooting) in accordance with the amount of movement of the touch in the horizontal axis direction (the direction perpendicular to the vertical axis) during the touch-move (slide operation).

In step S623, the system control unit 50 changes the aperture value (the setting value for main shooting) in accordance with the changed shutter speed. This change is made so that a combination of the changed aperture value and shutter speed corresponds to the appropriate exposure (the predetermined exposure). Furthermore, based on the aperture value and the shutter speed that are used in continuous image capturing for LV display, the system control unit 50 adjusts the value of the ISO sensitivity for LV display so that the image quality of LV images approaches the image quality of an image to be generated through image capturing that is performed using the setting values of the aperture, the shutter speed, and the ISO sensitivity for main shooting.

In step S624, the system control unit 50 moves the display position of the vertical bar 414 in line with the changed shutter speed. In step S625, the system control unit 50 changes the display position of the pointer 413 in such a manner that it moves on the linear indicator 412 (moves along the linear indicator 412) to the position of the intersection between the moved vertical bar 414 and the linear indicator 412. With this visual movement on the linear indicator 412 from the display position before the change to the display position after the change, the user can understand the influence of the change in the shutter speed that is made by the user operation on the aperture value in a more intuitive manner.

Figure 8A:
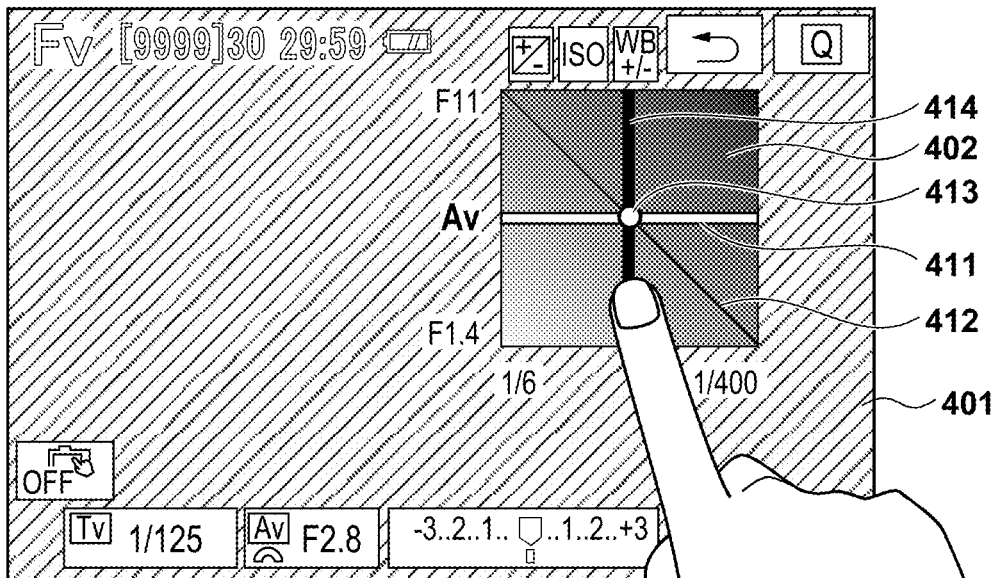
FIG. 8A is a diagram showing a screen that is displayed on the display unit 28 through processing of steps S622 to S625 of FIG. 6C.

FIG. 8A is a screen that is displayed on the display unit 28 through processing of steps S622 to S625. As can be understood from comparison with FIG. 7B, the position of the vertical bar 414 has moved in line with the changed shutter speed, and the position of the horizontal bar 411 indicating the aperture value has moved (as a result of changing the aperture value in accordance with the changed shutter speed). Then, the position of the pointer 413 has been moved to and displayed at the intersection between the vertical bar 414 and the linear indicator 412. Due to such display, when the aperture value is decided on automatically in accordance with a change in the shutter speed, how this decision is made in terms of relationships among respective elements displayed in the coordinate system region 402 can be presented in a visually easy-to-understand manner. Furthermore, as the setting of the shutter speed can be changed by directly operating the vertical bar 414 indicating the shutter speed, intuitive and easy-to-understand operability is realized.

In step S626, the system control unit 50 determines whether the user has performed a touch-up. When it is determined that the user has performed a touch-up, processing returns to step S315; otherwise, processing returns to step S621.

When it is determined that the user has not touched the vertical bar 414 in step S620, the system control unit 50 determines whether the user has performed the shutter speed changing operation by, for example, operating the shutter speed setting dial in step S627. When it is determined that the shutter speed changing operation has been performed, processing proceeds to step S628; otherwise, processing returns to step S315.

In step S628, the system control unit 50 changes the shutter speed in accordance with the substance of the shutter speed changing operation (e.g., the direction and the amount of the operation performed on the shutter speed setting dial). Then, the system control unit 50 moves the position of the vertical bar 414 in the coordinate system region 402 to the position corresponding to the changed shutter speed, and displays the resultant vertical bar 414.

In step S629, the system control unit 50 changes the aperture value in accordance with the changed shutter speed. This change is made so that a combination of the changed aperture value and shutter speed corresponds to the appropriate exposure (the predetermined exposure). Furthermore, based on the aperture value and the shutter speed that are used in continuous image capturing for LV display, the system control unit 50 adjusts the value of the ISO sensitivity for LV display so that the image quality of LV images approaches the image quality of an image to be generated through image capturing that is performed using the setting values of the aperture, the shutter speed, and the ISO sensitivity for main shooting.

In step S630, the system control unit 50 changes the display position of the pointer 413 in such a manner that it moves on the linear indicator 412 (moves along the linear indicator 412) to the position of the intersection between the moved vertical bar 414 and the linear indicator 412. With this visual movement on the linear indicator 412 from the display position before the change to the display position after the change, the user can understand the influence of the change in the shutter speed that is made by the user operation on the aperture value in a more intuitive manner.

Figure 8B:
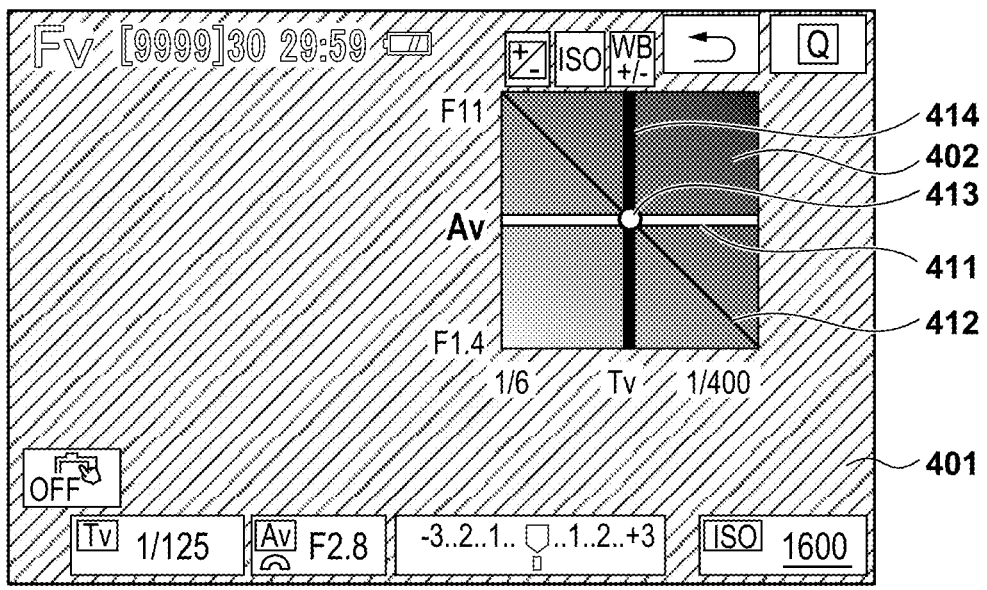
FIG. 8B is a diagram showing a screen that is displayed on the display unit 28 through processing of steps S628 to S630 of FIG. 6C.

FIG. 8B is a screen that is displayed on the display unit 28 through processing of steps S628 to S630. As can be understood from comparison with FIG. 7B, the position of the vertical bar 414 has moved in line with the changed shutter speed, and the position of the horizontal bar 411 indicating the aperture value has moved (as a result of changing the aperture value in accordance with the changed shutter speed). Then, the position of the pointer 413 has been moved to and displayed at the intersection between the vertical bar 414 and the linear indicator 412. Due to such display, when the aperture value is decided on automatically in accordance with a change in the shutter speed, how this decision is made in terms of relationships among respective elements displayed in the coordinate system region 402 can be presented in a visually easy-to-understand manner.

Note that the description of FIG. 3A to FIG. 5B has been given in relation to the case of the image capturing mode in which the shutter speed is decided on automatically based on the aperture value that can be changed by a user operation (the aperture priority mode). On the other hand, the description of FIG. 6A to FIG. 8B has been given in relation to the case of the image capturing mode in which the aperture value is decided on automatically based on the shutter speed that can be changed by a user operation (the shutter speed priority mode). That is to say, the foregoing has described a case where two exposure control parameters that correspond to the two axes of the coordinate system region 402 (a first exposure control parameter and a second exposure control parameter) are the aperture value and the shutter speed, respectively. However, in the present embodiment, a combination of these two exposure control parameters is not limited to the aperture value and the shutter speed. For example, any two of the aperture value, the shutter speed, and the ISO sensitivity can be selected as the two exposure control parameters that correspond to the two axes of the coordinate system region 402. For example, when the aperture value and the ISO sensitivity have been selected, the ISO sensitivity is replaced with the shutter speed in the description about the adjustment of the value of the ISO sensitivity for LV display in steps S323, S329, S623, and S629. That is to say, the target of this adjustment is an exposure control parameter that has not been selected as the two exposure control parameters that correspond to the two axes of the coordinate system region 402.

As described above, according to the first embodiment, the digital camera 100 displays the coordinate system region 402 representing a coordinate system that includes a first axis corresponding to the first exposure control parameter (e.g., the aperture value) and a second axis corresponding to the second exposure control parameter (e.g., the shutter speed). The digital camera 100 also displays the first indicator (e.g., the linear indicator 412) indicating the positions, in the coordinate system region 402, of a plurality of combinations of a value of the first exposure control parameter and a value of the second exposure control parameter that correspond to the predetermined exposure (e.g., the appropriate exposure). The digital camera 100 further displays the second indicator (e.g., the pointer 413) indicating the position, in the coordinate system region 402, of a combination of a setting value of the first exposure control parameter and a setting value of the second exposure control parameter.

This enables the user to intuitively understand the influence of a change in one setting value on another setting value in a situation where another setting value is decided on automatically based on one setting value so that the combination of setting values of the two exposure control parameters corresponds to the predetermined exposure.

Note that various types of control that have been described above as being performed by the system control unit 50 may be performed by one item of hardware, or a plurality of items of hardware (e.g., a plurality of processors and circuits) may share processing to control the entire apparatus.

Furthermore, although the present invention has been described in detail based on its preferred embodiment, the present invention is not limited to such a specific embodiment, and the present invention encompasses a variety of modes that do not depart from the essential spirit of this invention. In addition, the foregoing embodiment merely represents one embodiment of the present invention, and different embodiments may be combined where appropriate.

Also, the foregoing embodiment has been described in relation to the case where the exposure setting apparatus is the digital camera. However, the foregoing embodiment is also applicable to, for example, an exposure measurement device that measures the brightness of a subject desired by the user and calculates preferred exposure conditions, a remote controller that remotely controls an image capturing apparatus, and so forth. The foregoing embodiment is also applicable to a digital video camera, a digital single-lens camera, a mobile information terminal, a tablet PC, a mobile telephone, and other exposure setting apparatuses that can set exposure conditions. The foregoing embodiment is further applicable to a personal computer, a PDA, a mobile telephone terminal, a mobile image viewer, a display-equipped printer apparatus, a digital picture frame, a music player, a game device, an electronic book reader, and so forth.

Also, the present invention is applicable not only to an image capturing apparatus itself, but also to a control apparatus that communicates with an image capturing apparatus (including a network camera) via wired or wireless communication and remotely controls the image capturing apparatus. Apparatuses that remotely control an image capturing apparatus include, for example, such apparatuses as a smartphone, a tablet PC, and a desktop PC. An image capturing apparatus can be remotely controlled by a control apparatus notifying the image capturing apparatus of a command that causes various types of operations and settings to be made based on operations performed in the control apparatus and processing performed in the control apparatus. Furthermore, live-view images shot by an image capturing apparatus may be received via wired or wireless communication and displayed on a control apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147957, filed Aug. 9, 2019, which is hereby incorporated by reference herein in its entirety.

What is claimed is:

1. An exposure setting apparatus, comprising:
at least one processor and/or at least one circuit to perform operations of following units:
an obtainment unit configured to obtain a setting value of a first exposure control parameter;
a first decision unit configured to decide on a setting value of a second exposure control parameter based on the setting value of the first exposure control parameter so that a combination of the setting value of the first exposure control parameter and the setting value of the second exposure control parameter corresponds to predetermined exposure; and
a display control unit configured to perform control to display a coordinate system region, a first indicator, and a second indicator on a display unit, the coordinate system region representing a coordinate system that includes a first axis corresponding to the first exposure control parameter and a second axis corresponding to the second exposure control parameter, the first indicator indicating positions, in the coordinate system region, of a plurality of combinations of a value of the first exposure control parameter and a value of the second exposure control parameter that correspond to the predetermined exposure, the second indicator indicating a position, in the coordinate system region, of the combination of the setting value of the first exposure control parameter and the setting value of the second exposure control parameter.

2. The exposure setting apparatus according to claim 1, wherein the at least one processor and/or the at least one circuit further performs an operation of a change unit configured to change the setting value of the first exposure control parameter in accordance with a user operation,
wherein when the setting value of the first exposure control parameter has been changed,
the first decision unit changes the setting value of the second exposure control parameter based on the changed setting value of the first exposure control parameter so that a combination of the changed setting value of the first exposure control parameter and the changed setting value of the second exposure control parameter corresponds to the predetermined exposure, and
the display control unit performs control to change a display position of the second indicator to indicate a changed position, in the coordinate system region, of the combination of the changed setting value of the first exposure control parameter and the changed setting value of the second exposure control parameter.

3. The exposure setting apparatus according to claim 2, wherein
the first indicator has an external appearance that connects the positions, in the coordinate system region, of the plurality of combinations that correspond to the predetermined exposure, and
performing control to change the display position of the second indicator includes performing control in such a manner that the second indicator moves along the first indicator from the display position of the second indicator before a change to the display position thereof after the change.

4. The exposure setting apparatus according to claim 2, wherein
the display control unit performs control to display a first line segment on the display unit, the first line segment being parallel to the second axis and passing through the position, in the coordinate system region, of the combination of the setting value of the first exposure control parameter and the setting value of the second exposure control parameter, and
when the setting value of the first exposure control parameter has been changed, the display control unit performs control to change a display position of the first line segment to pass through the changed position, in the coordinate system region, of the combination of the changed setting value of the first exposure control parameter and the changed setting value of the second exposure control parameter.

5. The exposure setting apparatus according to claim 4, wherein the at least one processor and/or the at least one circuit further performs an operation of a detection unit configured to detect a touch with respect to the display unit,
wherein when a slide operation involving a first touch from the display position of the first line segment to another position has been detected, the change unit changes the setting value of the first exposure control parameter based on an amount of movement of the touch in a direction perpendicular to the second axis during the slide operation.

6. The exposure setting apparatus according to claim 4, wherein
the display control unit performs control to display a second line segment on the display unit, the second line segment being parallel to the first axis and passing through the position, in the coordinate system region, of the combination of the setting value of the first exposure control parameter and the setting value of the second exposure control parameter.

7. The exposure setting apparatus according to claim 1, wherein the at least one processor and/or the at least one circuit further performs operations of following units:
a photometry unit configured to measure a brightness of a subject; and
a second decision unit configured to decide on the predetermined exposure based on a result of the measurement,
wherein the display control unit performs control to display the first indicator in accordance with the decision on the predetermined exposure based on the result of the measurement.

8. The exposure setting apparatus according to claim 1, wherein
the display control unit performs control to successively display a plurality of images that are generated through continuous image capturing performed by an image capturing unit as live-view images on the display unit, together with the coordinate system region, the first indicator, and the second indicator.

9. The exposure setting apparatus according to claim 8, wherein the at least one processor and/or the at least one circuit further performs an operation of an exposure control unit configured to perform control to, based on a value of the first exposure control parameter and a value of the second exposure control parameter that are used in the continuous image capturing, adjust a value of a third exposure control parameter used in the continuous image capturing so that an image quality of the live-view images approaches an image quality of an image to be generated through image capturing that is performed by the image capturing unit using the setting value of the first exposure control parameter, the setting value of the second exposure control parameter, and a setting value of the third exposure control parameter.

10. The exposure setting apparatus according to claim 1, wherein
the first exposure control parameter is one of an aperture value, a shutter speed, and an ISO sensitivity,
when the first exposure control parameter is the aperture value, the second exposure control parameter is the shutter speed or the ISO sensitivity,
when the first exposure control parameter is the shutter speed, the second exposure control parameter is the aperture value or the ISO sensitivity, and
when the first exposure control parameter is the ISO sensitivity, the second exposure control parameter is the aperture value or the shutter speed.

11. A control method of an exposure setting apparatus, comprising:
obtaining a setting value of a first exposure control parameter;
deciding on a setting value of a second exposure control parameter based on the setting value of the first exposure control parameter so that a combination of the setting value of the first exposure control parameter and the setting value of the second exposure control parameter corresponds to predetermined exposure; and
performing control to display a coordinate system region, a first indicator, and a second indicator on a display unit, the coordinate system region representing a coordinate system that includes a first axis corresponding to the first exposure control parameter and a second axis corresponding to the second exposure control parameter, the first indicator indicating positions, in the coordinate system region, of a plurality of combinations of a value of the first exposure control parameter and a value of the second exposure control parameter that correspond to the predetermined exposure, the second indicator indicating a position, in the coordinate system region, of the combination of the setting value of the first exposure control parameter and the setting value of the second exposure control parameter.

12. A non-transitory computer-readable storage medium which stores a program for causing a computer to execute a control method comprising:
obtaining a setting value of a first exposure control parameter;
deciding on a setting value of a second exposure control parameter based on the setting value of the first exposure control parameter so that a combination of the setting value of the first exposure control parameter and the setting value of the second exposure control parameter corresponds to predetermined exposure; and
performing control to display a coordinate system region, a first indicator, and a second indicator on a display unit, the coordinate system region representing a coordinate system that includes a first axis corresponding to the first exposure control parameter and a second axis corresponding to the second exposure control parameter, the first indicator indicating positions, in the coordinate system region, of a plurality of combinations of a value of the first exposure control parameter and a value of the second exposure control parameter that correspond to the predetermined exposure, the second indicator indicating a position, in the coordinate system region, of the combination of the setting value of the first exposure control parameter and the setting value of the second exposure control parameter.

* * * * *